United States Patent [19]

Baker

[11] Patent Number: 4,685,399

[45] Date of Patent: Aug. 11, 1987

[54] INTERMODAL TRANSPORT

[76] Inventor: Dorian R. W. Baker, Oriel Villa, 64 Bloomfield Avenue, Bath BA2, 3AA, United Kingdom

[21] Appl. No.: 740,060

[22] PCT Filed: Sep. 25, 1984

[86] PCT No.: PCT/GB84/00326

§ 371 Date: May 29, 1985

§ 102(e) Date: May 29, 1985

[87] PCT Pub. No.: WO85/01481

PCT Pub. Date: Apr. 11, 1985

[30] Foreign Application Priority Data

Sep. 30, 1983 [GB] United Kingdom ............... 8326276

[51] Int. Cl.⁴ ........................... B61D 3/12; B61F 3/12
[52] U.S. Cl. .................................... 105/4.1; 280/408; 280/476 R; 410/53
[58] Field of Search ................ 105/4 R, 159, 215 C, 105/4.1, 215.2; 410/44, 45, 53, 54; 280/408, 423 A, 476 R

[56] References Cited

U.S. PATENT DOCUMENTS

| 2,036,535 | 4/1936 | Nelson | 105/159 |
| 2,263,578 | 11/1941 | Hickman | 105/215 C |
| 2,709,969 | 6/1955 | Andert | 105/159 |
| 2,787,971 | 4/1957 | Obes | 105/215 C |
| 2,841,094 | 7/1958 | Schumacher | 105/159 |
| 4,111,451 | 9/1978 | Pinto | 280/408 |
| 4,179,997 | 12/1979 | Kirwan | 410/53 |
| 4,416,571 | 11/1983 | Krause | 410/53 |

FOREIGN PATENT DOCUMENTS

| 766525 | 6/1934 | France . |
| 785578 | 8/1935 | France . |
| WO81/01537 | 6/1981 | PCT Int'l Appl. . |
| 374018 | 1/1964 | Switzerland . |
| 787886 | 12/1957 | United Kingdom . |
| 929115 | 6/1963 | United Kingdom . |

Primary Examiner—Randolph A. Reese
Attorney, Agent, or Firm—Reed Smith Shaw & McClay

[57] ABSTRACT

A bogie for use in an intermodal transport system has wheels rotatably mounted about two spaced parallel axes, and a coupling device (33) for securing the bogie to a wheeled rail wagon, one end of which is supported on the bogie. The coupling device (33) cooperates with a coupling device, provided at that end of the wagon, which are adapted to couple the wagon to another wagon or to a locomotive in normal use of the wagon.

An intermodal transport system comprises such a wagon; a drive device, e.g. a tractor for road and a locomotive for rail; and a bogie provided with road wheels or rail wheels of a gauge different to that of that of the wagon, in accordance with the mode of transport over which the wheeled wagon is to be transported.

12 Claims, 23 Drawing Figures

INTERMODAL TRANSPORT

TECHNICAL FIELD

This invention relates to a bogie suitable for use in an intermodal transport system, for example for intermodal transport of passengers, freight or of other items not primarily intended as transport units, and to such an intermodal transport system. In particular, the system may be used for routes where it may be expedient to undertake the trunk haul by one transport mode, such as railway, while local collection and delivery are undertaken by another transport mode, such as road.

It is desirable to convey a cargo from origin to destination without the need to tranship the cargo from one vehicle or container to another during a journey that employs two or more transport modes. In this respect, capital equipment is under-utilized (time related cost) and makes an unproductive increase in weight of equipment being used to convey the cargo (movement related cost) when a fixed part of a vehicle adapted for one transport mode is conveyed by a further vehicle adapted for the second transport mode. In addition, auxiliary equipment utilized during a discrete movement by a transport mode for which the vehicle is not fully equipped, may duplicate a measure of the inherent capability of the vehicle.

It is also desirable to simplify the means by which the transfer from one mode to another is accomplished so as to obviate the need for capital intensive equipment such as straddle cranes and thus enable such transfer to be accomplished at remote or random locations without commitment to intensive use of sites.

Carriage of freight between origin and destination should be arranged for the minimum expenditure in cost and/or time. It is not always most economic to transfer freight wholly by road. Often, the fuel and manpower-saving potential of rail carriage are used en route for non rail-connected origins or destinations, in which case the intermodal transfer of the conveying vehicle or container from road to rail and vice-versa should be made as quick and simple as possible.

BACKGROUND ART

Several systems have been proposed to implement intermodal transfer as a commercially viable alternative to the wholly road freight services which are available. Such systems include road semi-trailers or complete lorries on rail wagons, that is, "Piggyback" transport (T.O.F.C.), in Europe, North America and Australia, and the inland movement of containers or "swap bodies" (C.O.F.C.). The disadvantage of these systems is that although transfer is simplified, the equipment required to accomplish it is large, costly and, consequently, few and far between. The rail vehicles add considerable tare weight to the trunk haul and items of the equipment are carried about as additional tare rather than performing assets. That these systems are unsatisfactory is amply demonstrated by the number of attempts there have been to develop smaller or cheaper container transfer equipment, lighter "Piggyback" rail wagons and by the success of such systems as British Rail's Speedlink general merchandise trains which can involve considerable transhipment of goods between rail and road vehicles at each end of the rail journey.

The "Road-Railer" freight vehicles of the Bi-Modal Corporation of America represent one attempt to develop a vehicle which would enable the railway to provide a service comparable to those offering wholly road freight, door-to-door services using a conventional articulated lorry. However, "Road-Railer" vehicles are not compatible with other rail traffic and their use must be limited to dedicated services over specially authorized routes capable of taking their high (27 ton) axle loads. In essence, the vehicle is a road type, articulated lorry trailer, adapted by means of a special coupling and a retractable rail axle to run on rails. A train has to be formed behind a special truck to carry the front end of the first trailer and to couple to the rail locomotive. Once formed, such a train cannot be broken or re-shunted in any normal railway manner without completely dismantling it because it becomes articulated throughout its length.

French Patent Specification No. 785,578 discloses an intermodal transport system having a bogie for supporting a wheeled rail wagon. The bogie is provided with road wheels and is connectible to the rail wagon by means of a fifth wheel coupling. A tractor pushes the bogie under one end of the railway wagon, thereby raising that end to be supported on the bogie. The tractor then drives round to reverse under the other end of the wagon, to which it is connected by a further fifth-wheel coupling so that the wagon can be conveyed by road by the tractor and the bogie. This system is limited in its application since there is no provision for a train of wagons, mounted on such bogies, to be formed, either for road or rail transport. Furthermore, the fifth wheel coupling arrangement needs to be provided on the wagon in addition to the standard couplings required to hitch the wagons together in a conventional train.

DISCLOSURE OF THE INVENTION

According to the present invention there is provided a bogie for supporting a wheeled rail wagon, characterized in being provided with a coupling means for cooperation with coupling means provided on the wagon to secure the bogie to the wagon such that an end region of the wagon is supported on the bogie, said coupling means provided on the wagon being adapted to couple the wagon, when not supported on the bogie, to a wheeled unit to form an articulated assembly.

Preferably, the bogie is provided with roller means for supporting the wagon on the bogie for longitudinal displacement to bring the respective coupling means on the wagon and bogie into engagement with each other.

The coupling means provided on the bogie may comprise a coupling hook element for cooperation with a coupling hook element which is mounted on the wagon for pivotable movement about an upwardly extending axis.

The bogie may be provided with means for preventing relative rotation between the wagon and the bogie about an upwardly extending axis when the end region of the wagon is supported on the bogie.

In one emodiment, the bogie is provided with two such coupling hook elements whereby the bogie can be connected to such rail wagons, each coupling hook element of the bogie being for cooperation with the coupling hook element of a respective one of the rail wagons to secure the bogie to the wagons such that the end region of each wagon is supported on the bogie. In this manner, it is possible to form rail trains of bogies and wagons, each bogie serving to couple together two rail wagons.

The bogie may be adapted to be driven beneath the end region of the rail wagon thereby to raise that end region to cause that region to be supported on the bogie. In addition, the bogie may be provided with further coupling means for coupling the bogie to a wheeled unit to form an articulated assembly.

The or each coupling hook element provided on the bogie may be fixed with respect to the bogie.

The present invention also provides, from a second aspect, an intermodal transport system comprising:

a rail wagon having an end region provided with a coupling means adapted to couple the wagon to a wheeled unit to form an articulated assembly, and being provided with rail wheels adapted for a first mode of transport;

a drive means adapted for a second mode of transport and connectible to the opposite end region of the wagon; and a bogie according to the first aspect of the present invention whose wheels are adapted for the second mode of transport, whereby the wagon can selectively be conveyed (a) by the first mode of transport when drawn by a locomotive and (b) by the second mode of transport when drawn by the drive means and supported on the bogie.

The coupling means provided on the wagon may comprise a coupling hook element which is mounted on the wagon for pivotable movement about an upwardly extending axis.

The first mode of transport may be a railway of one gauge, while the second mode of transport is a railway of another gauge. Alternatively, the second mode of transport may be road, in which case the drive means conveniently comprises a tractor.

The present invention also provides, from a third aspect, a bogie for interconnecting two transport containers, the bogie having wheels mounted for rotation about at least two spaced parallel axes, characterised in that the bogie is provided, at opposite end regions, with a respective coupling means by means of which the end regions of the bogie are connectible respectively to the containers thereby to interconnect the containers with the adjacent ends of the containers supported on the bogie, and coupling means permitting rotation of the containers relative to the bogie about respective upwardly extending axes.

The coupling means may be a fifth-wheel coupling.

The present invention also provides, from a fourth aspect, a transport container comprising a base having a central region with support means for supporting the container on the ground, characterised in that the container has opposite end regions which are spaced above the ground when the container is supported on the support means, the underside of each end region being at a higher level than the base and having a respective coupling means whereby a respective wheel assembly can be placed under and coupled to each end region of the base thereby to support the container with the support means clear of the ground, the container being constructed such that it is capable of withstanding a tensile or compressive load between its end regions of at least 180,000 kilograms force.

The transport container may be combined with two wheel assemblies, the coupling means and the wheel assemblies being adapted to cooperate in such a way that displacement of each wheel assembly towards the central region for engagement with the respective coupling means causes the respective end regions to be lifted.

The wheel assembly may comprise a bogie according to the third aspect of the present invention.

Road or rail trains may be constructed by connecting two or more containers according to the fourth aspect of the present invention end to end, adjacent containers being mounted on a common bogie according to the third aspect of the present invention. For this purpose, it is preferable for the road wheel bogies to comprise steerable wheels, which may be controllable in response to relative pivotal movement between the road wheel bogie and the or each container mounted on it. The bogie according to the third aspect of the present invention may also be used to interconnect rail wagons.

The transport container according to the fourth aspect of the present invention is thus designed to withstand the more exacting conditions imposed when travelling by rail, that is high speeds, compressive buffing loads, and tensile haul loads (the tensile and compressive loads to be carried being about 180,000 kg force (400,000 lbs force)). However, the container can also be adapted so as to be light for road transport and handling. The container may thus be conveniently conveyed by road, rail or, on its own, by sea.

The bogies may be provided with such equipment or fittings, including wheels, brakes, couplings, registration marks, warning or indication devices and the like as are appropriate to the particular transport mode for which the bogie is intended and for which the wagon itself is not fully equipped.

The expected advantages to be gained from such a system are that a conveyance is provided wherein goods may be stowed and secured intact for a journey which employs several modes of transport. In addition:

(1) Tare weight, particularly on the rail haul, is minimized. In fact a train constructed of wagons conveyed in accordance with embodiments of the present invention would be lighter in tare weight per unit capacity than any other railway going trains provided in an intermodal transport system.

(2) Each wagon equipped, for example, to run on a railway of a particular gauge, may be handled in the same way as other railway wagons operated on that particular railway, in other words it can be shunted and assembled into trains for various destinations among other railway wagons.

(3) Wagons may be transferred simply between road and rail modes at sites requiring minimal fixed capital investment and without the need for transfer-dedicated equipment at such sites.

(4) Wagons may be transferred to running gear adapted to a railway gauge for which the vehicle is not appropriately equipped, in a simple manner and without severe duplication of effort.

(5) Where a change of mode from a first mode to a second mode takes place, wagons may be delivered and auxiliary transport equipment appropriate to the first mode of transport recovered immediately, without the provision of fixed capital equipment or the presence of transfer - dedicated equipment at such sites of destination or origin.

Such advantages would be of benefit in any situation where traffic must negotiate a change of transfer mode, as where:

intermodal transport is required to have a lighter tare weight on rail than is generally the case at present;

traffic must transfer or be transhipped between rail and road transport;

the benefits of existing intermodal transfer techniques cannot be exploited for financial reasons;

rail traffic must negotiate a change of gauge; and a service is to be developed on a route whose characteristics alter for example when civil engineering works are being carried out to change the whole route from highway to railway or from one railway gauge to another.

BEST MODE OF CARRRYING OUT THE INVENTION

Figures 1, 2, 3:
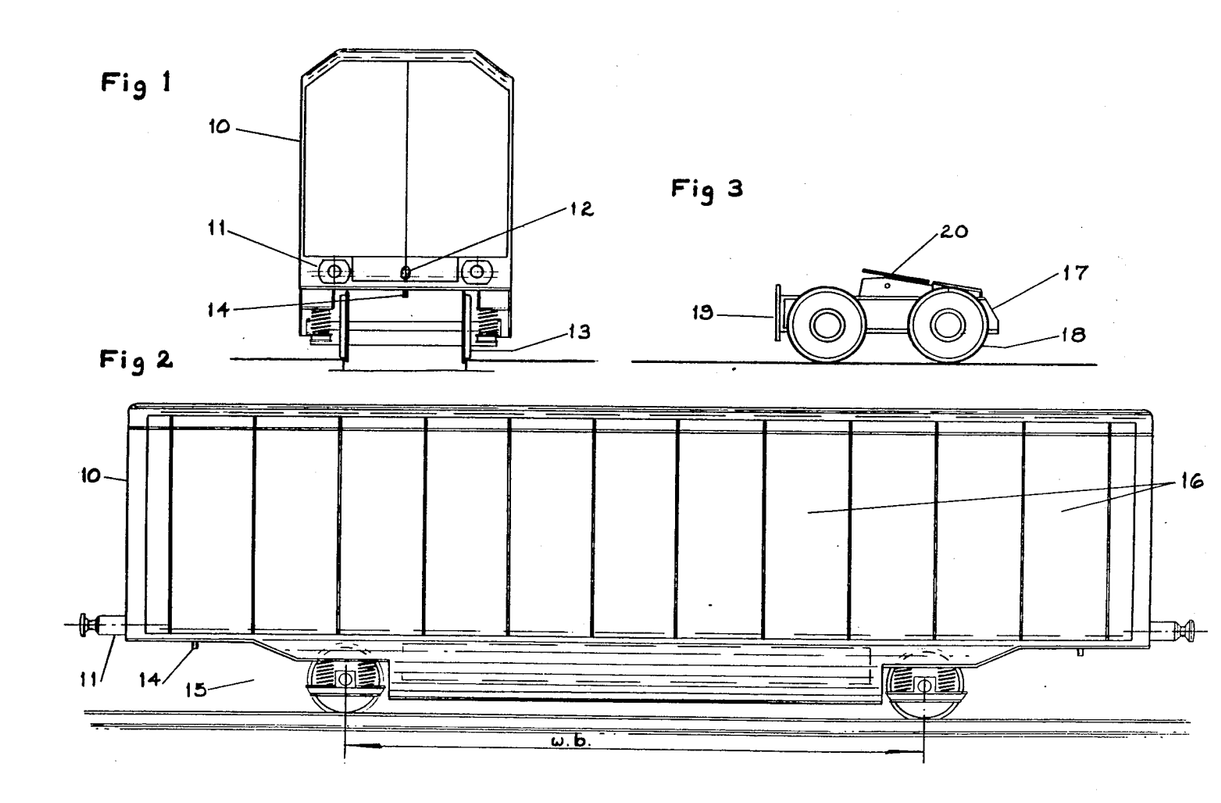
FIG. 1 is an end view of a rail van.
FIG. 2 is a side view of the rail van of FIG. 1.
FIG. 3 is a side view of a road-going bogie of end trailing type.

The rail wagon 10 of FIGS. 1 and 2 is of such dimensions and weight as are appropriate to the railway administration and highway regulations within which it is to be operated, and has buffers 11, couplings 12, and running gear 13, including wheels, suspension and brakes. The relationship between the length of the wagon and its wheel base (w.b.) is such that sufficient space 15 is left below the wagon 10 at its ends to allow a bogie to fit thereunder. Such a bogie 17 is shown in FIG. 3 and has rubber tires 18, an assemblage 19 comprising road traffic warning lamps, indicators and a registration plate, and a "fifth-wheel" coupling plate 20, of a type that will mate with a bearing plate and kingpin 14 on the rail wagon 10. The plate and kingpin 14 are situated on the underside of the wagon 10 over the space 15 at a height, measured from rail level, compatible with local articulated lorry construction, for reasons which will be described later.

The fifth-wheel coupling 20 of the bogie 17 is similar to such units as are fitted to articulated lorry tractors except that, in the embodiment shown in FIG. 3, (a trailing end bogie), the coupling plate is allowed no horizontal freedom; its jaw center-line is fixed in line with that of the chassis of the bogie. In addition it is provided with one or more upwardly projecting bolts or spigots (not shown) which engage with rebates or sockets (not shown) in the bearing plate on the underside of the wagon 10. Consequently horizontal rotation is prevented between the faces of the fifth-wheel and the bearing plate and thus hold the wagon 10 in line with the center-line of the bogie 17 when the bogie is coupled to the wagon.

Figure 4:
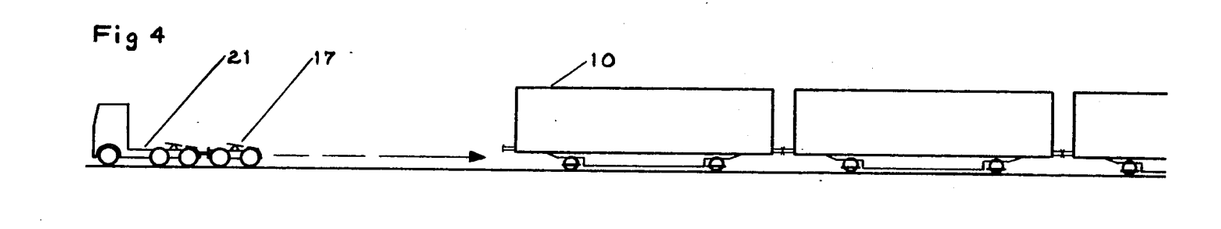
FIGS. 4 to 6 show three stages in the transfer of a wagon as shown in FIGS. 1 and 2 from rail-going to road-going use.
Figure 5:
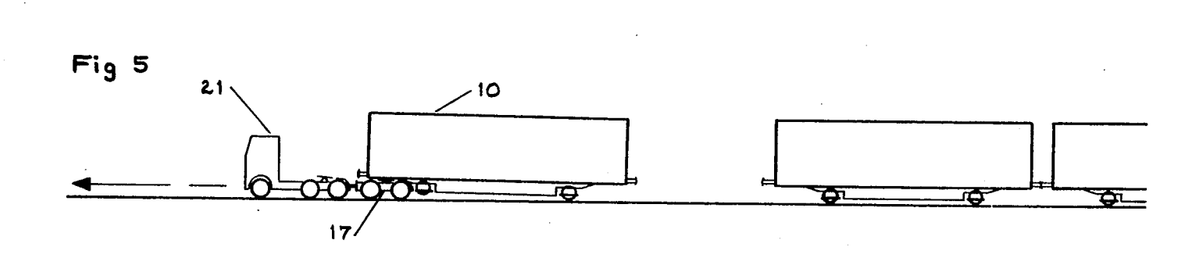
Figure 6:
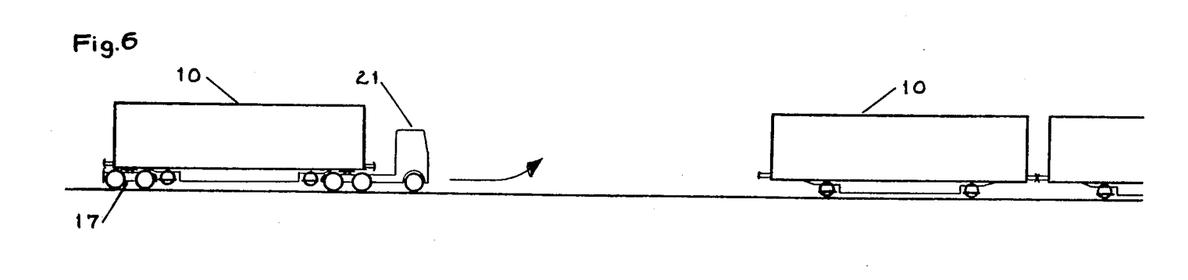

Referring to FIGS. 4, 5 and 6 transfer from rail to road may be effected in the following manner. After a railway locomotive pulling a train of a plurality of rail wagons has left such a train, prevented from moving by air brakes, a road tractor 21 backs a bogie 17 into the space 15 provided under one end of the first wagon 10 so lifting that end of the wagon off the rails.

The first wagon 10 is then uncoupled from the next wagon, the air brakes of its rail wheels are connected to the bogie 17 and thence to the road tractor 21, which may now draw the bogie and wagon away from the rest of the train. The tractor 21 is then disconnected from the bogie 17, runs around the wagon 10 and picks up its other end. The air brakes and electrical circuitry of the bogie 17 is connected to the tractor and the assemblage is prepared for the road journey. Transfer from road to rail may be effected by the reverse of the above procedure at an interchange siding. Such a siding may consist of a railway siding with roadway paving to rail head level to the outside of and between each rail, with provision for a rail wheel flangeway. For ease of re-railing it would be helpful if the siding were of a slightly broader than standard gauge.

Figures 14, 15:
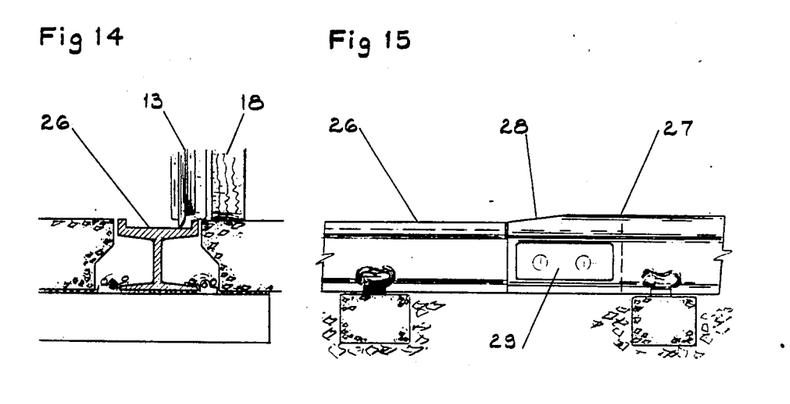
FIG. 14 shows a grooved rail.
FIG. 15 shows a junction between the rails of FIG. 14 with a conventional rail.
Figure 16:
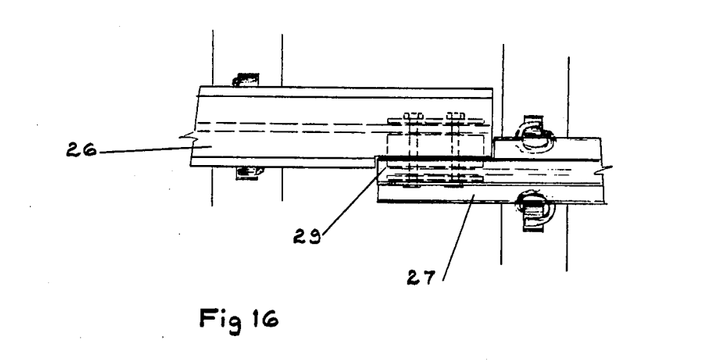
FIG. 16 is a plan view of the arrangement of FIG. 15.

An alternative siding is shown in FIGS. 14 to 16, for an intensively used interchange. As shown the siding comprises a pair of grooved tram rails 26 having wide shallow flangeways, say 130 mm (30 mm basic flangeway plus 100 mm tolerance for re-railing)×25 mm deep, set at 100 mm broader than the railway gauge. The tractor driver would be able to drop the leading end pair of rail wheels 13 into the flangeway, then drive the tractor round the rail wagon, back up to the bogie at the rear end and push the assemblage running on the flanges of the leading railway wheels up to the railway end of the interchange siding. Here the tram rails 26 taper to true gauge before mating with normal track 27 with provision for taking the wheels from running on their flanges onto their steel tires such as by tapering the rail head 28 as shown in FIG. 15. FIG. 16 is a plan view of the connection between the tram rail 26 described and a normal flat-bottom rail 27. The flanges of both rails are trimmed to allow them to be huck-bolted using suitable cast-iron spacers and fish plates 29.

Figure 7:
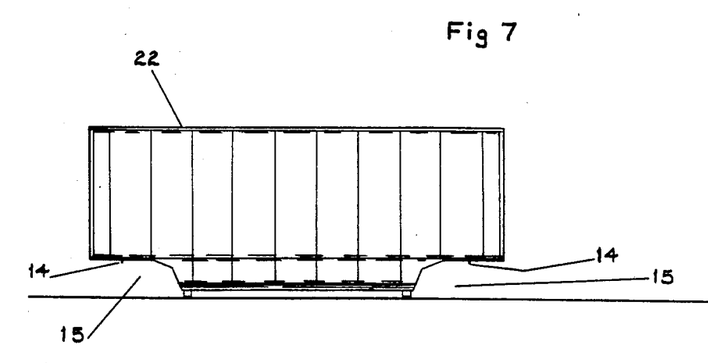
FIG. 7 is a side view of a freight container.
Figure 8:
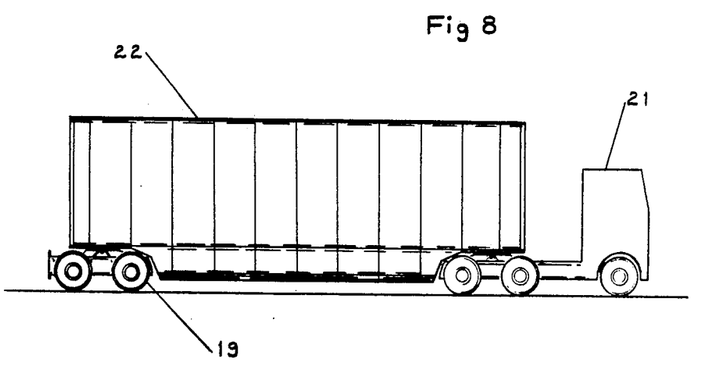
FIG. 8 shows the container of FIG. 7 adapted for road transport.

Referring now to FIGS. 7 to 10, a container 22 has a structure able to meet the requirements of the most exacting mode by which it is to be conveyed whether solely by road; by rail where it is subject to train tensile loads, acceleration levels and brake forces, or by sea, for which lifting and stacking parameters may be specified. The construction is such as to permit the unit 22 to stand on level ground as illustrated in FIG. 7 with suitable spaces 15 beneath bearing plates and kingpins 14' to allow a bogie 19 to be introduced at one end and a tractor 21 at the other as shown in FIG. 8, in a manner similar to that described in the initial example with reference to FIGS. 3 to 6.

Figure 9:
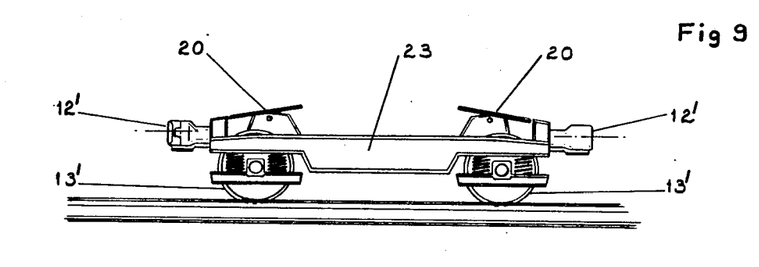
FIG. 9 is a side view of a rail-going bogie.
Figure 10:
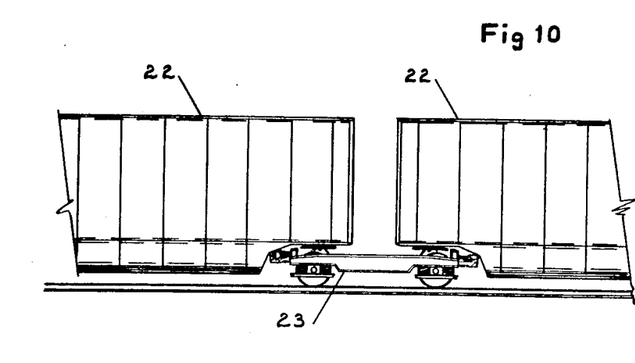
FIG. 10 shows two containers as shown in FIG. 7 interconnected by a bogie as shown in FIG. 9.

The illustrated container does not have its own running gear, but may be conveyed by rail using a bogie 23, as shown in FIG. 9. This bogie 23 has wheels, axles, suspension and brakes 13', railway coupling 12' and two fifth-wheel couplings 20. Unlike the road-going bogie 17 of FIG. 3, the two fifth-wheel coupling plates 20 are allowed horizontal freedom so that they can rotate about a horizontal axis coinciding with that of the kingpin 14' of the container (see FIG. 7) when coupled thereto. Upwardly projecting bolts or spigots (not shown) able to rotate with the coupling plate, engage with rebates or sockets (not shown) in the underside of the bearing plate 14 so as to provide additional shear strength in the lengthwise direction of a train perpendicular to the axis of such bolts and the kingpin 14', so as to sustain the forces described above. FIG. 10 illustrates the use of such bogies 23 to convey a number of containers 22 by rail as, or as part of, a railway train. By equipping each bogie with railway couplings at each end the need for barrier wagons or adapter units is obviated. On some railways it may be necessary for this coupling to fold clear of the fifth-wheel coupling if heights interfere.

Figure 11:
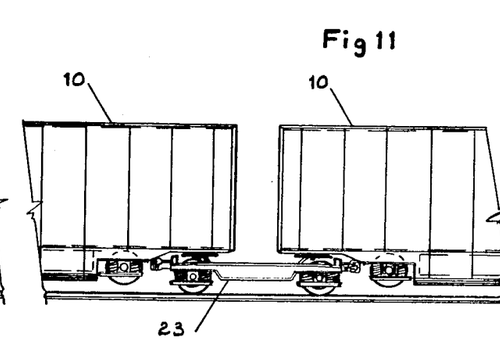
FIG. 11 shows two wagons as shown in FIGS. 1 and 2 interconnected by a bogie as shown in FIG. 9.
Figure 12:
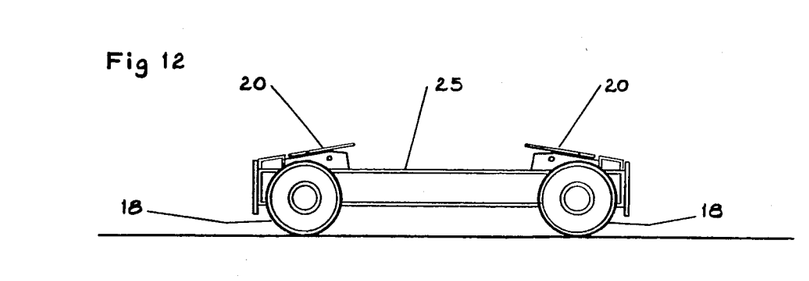
FIG. 12 shows a road-going bogie for intermediate articulations.

FIG. 11 shows how a narrow gauge wagon 10 may be conveyed on standard or broad gauge track using a rail-going bogie 23 in exactly the same manner as described for the container 22.

It will be appreciated that the same procedure as described may be used to transfer wagons of one gauge to rail of a different gauge.

The transfer to or from the bogie 23 is effected in a similar manner to that described for road-going bogies 17 except that a shunting locomotive would be employed working in and out of a second siding intended for the storage of rail-going bogies.

Figure 13:
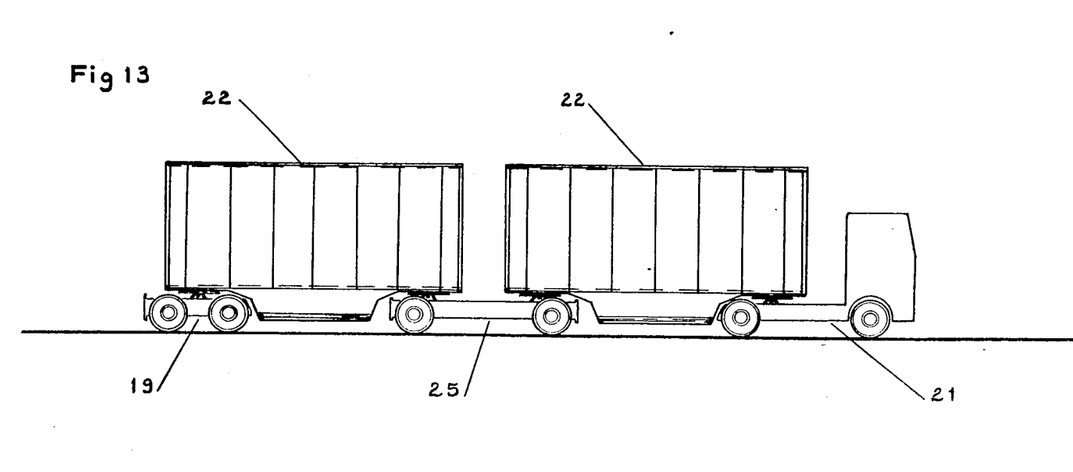
FIG. 13 shows two containers as shown in FIG. 7 interconnected by a bogie as shown in FIG. 12.

In certain situations it may be appropriate to convey a number of containers 22 in the form of a road train as illustrated in FIG. 13 employing a conventional tractor unit 21, using a bogie 17 having one fifth-wheel together with an intermediate articulation bogie 25. This bogie 25 has two fifth-wheel coupling plates with additional upwardly projecting bolts as described for the rail bogie 23 but which, although able to rotate horizontally are not able to rotate freely. The horizontal rotation of the two couplings of the bogie 25 would be linked and/or steerable axles may be provided so as to obviate jackknifing and provide a complete road train offering controllable steering to all the trailing axles in order to reduce tire scrub, corner cutting and the tendency for containers in multiple container road trains to snake or hunt when the leading prime mover (i.e. tractor 21) is travelling in a straight line at speed. Other forms of the articulation bogie might have one or both axles steered, have three or more axles, be equipped with cross-country or balloon-tires for trans-desert routes or carry engines and powered axles controlled remotely from the leading prime mover.

On some railways, such as those belonging to the Association of American Railroads or the Indian Meter gauge the level of the coupling/buffer attachment on conventional rail wagons is closer to rail level than would be compatible with the use of kingpin and fifth-wheel coupling apparatus as is described with reference to the foregoing embodiments. In such cases an amended carrying/coupling arrangement may be as shown in FIGS. 17 to 20.

Figure 19:
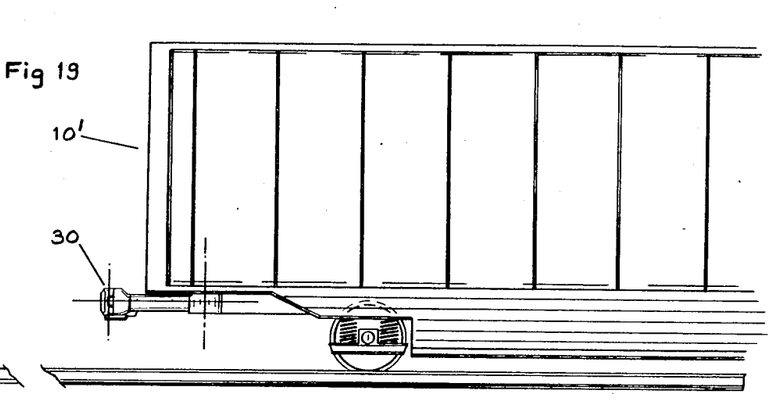
FIG. 19 is a part side view of a wagon for use with the bogie of FIGS. 17 and 18.
Figure 20:
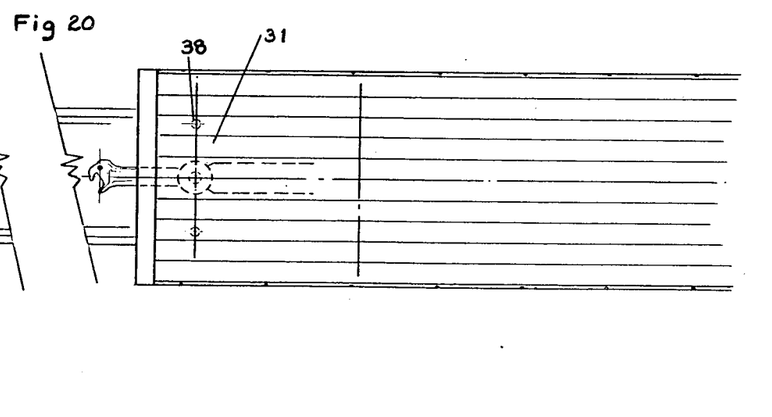
FIG. 20 is a part plan view of the wagon of FIG. 19.
Figure 21:
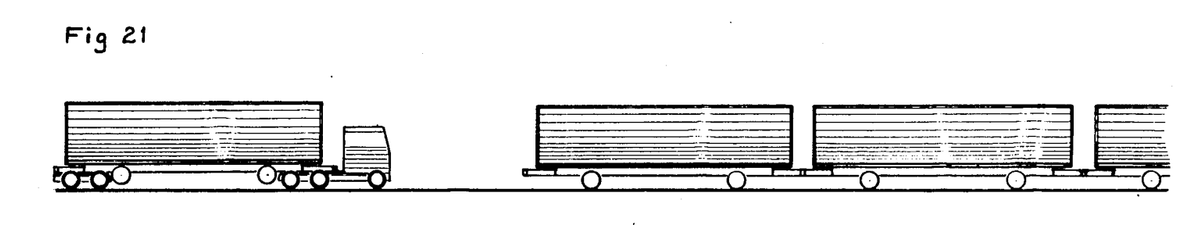
FIG. 21 shows wagons as shown in FIGS. 19 and 20 in both rail-going and road-going modes.

Each rail wagon 10' is equipped with two couplings 30 (one of which is shown in FIG. 19) of, for example, AAR type E or F, disposed one at each end and attached to the the wagon 10' in such a way as to permit rotation about an upwardly extending axis to, for example, 60° of arc to either side of the center-line of the wagon 10' in the horizontal plane and at such a level as is the normal practice of the railway on which it is to be used. The adjacent underside panels 31 (FIG. 20) of the wagon are to have such stiffness and be connected to the wagon load-carrying structure in such a way as to permit the weight of the wagon 10' to be borne by roller bearings 32 mounted on a towing road-going tractor and bogie.

Figure 17:
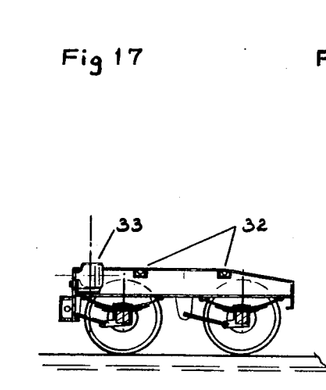
FIG. 17 is a section along the centre-line of an alternative embodiment of road-going bogie.
Figure 18:
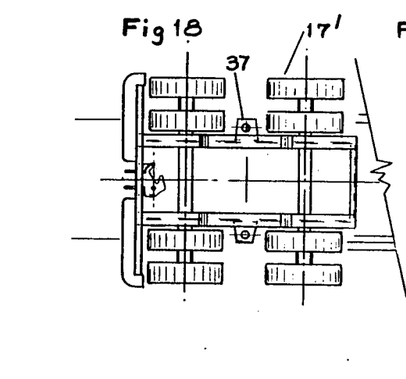
FIG. 18 is a plan view of the road-going bogie of FIG. 17.

Each towing road-going tractor and bogie has a pair or pairs of bearings 32 mounted at each side of the center-line in such a way as to transmit vertical forces and accelerations between rail wagon and tractor or bogie. Each tractor and bogie is also equipped with a railroad coupling 33 which engages that of the wagon 10' so as to transmit axial forces and accelerations between rail wagon and the tractor and bogie. The arrangement of the coupling on the tractor is such that the mated couplings are held in line, along the center line of the tractor, while permitting relative rotation between tractor and rail wagon about the upwardly extending axis of the rail wagon AAR coupling mounting 30. The road-going bogie 17' (a trailing end bogie) is arranged in such a way as to resist such relative rotation having upwardly projecting bolts or spigots 37 which engage with rebates or sockets 38 in the bearing plate on the underside of the rail wagon.

Figure 22:
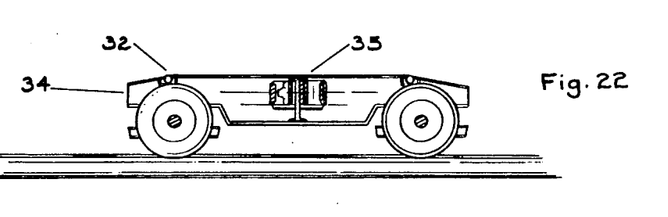
FIG. 22 is a section along the center-line of another type of rail bogie.

FIG. 22 shows a bogie 34 which might be employed on Indian broad gauge to convey a meter gauge rail wagon. Pairs of bearings 32 are provided at each end of the bogie 34 so as to allow meter gauge wagons to be lifted and carried with their own couplers mated with an adjoining pair of couplers 35 fixed on the center-line of the bogie 34, relative rotation being allowed about the upwardly extending axis through the rail wagon coupling mounting as in FIG. 20. Intermediate road bogies of this type would be the same as the bogie 34 except for the provision of road wheels instead of rail wheels.

The containers 22 hereinbefore described would be ideally suited to this low coupling AAR situation. The rail bogie 23 would not require couplings capable of folding clear and a fully articulated train of any length could be formed using the standard bogie 23 at intermediate articulations and at the interface with the prime mover, i.e. a locomotive and guardsvan. If it is planned to divide the articulated train en route then two such bogies may be introduced at that point in the train. Such a bogie might also serve as an adapter unit for Road Railers, as manufactured by Bi-Model Corporation or for connecting to ordinary wagons.

Figure 23:
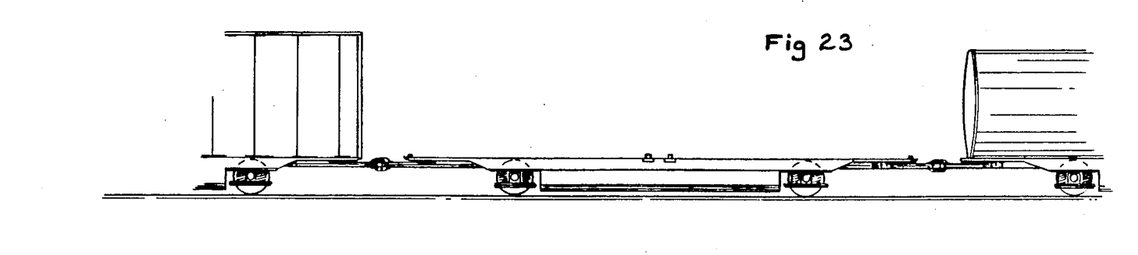
FIG. 23 shows a container wagon, a flat bed wagon and a tanker wagon coupled to form a train.

In all the foregoing examples box containers or wagons have been illustrated and discussed but it will be apparent that any conveyance mode could be adapted, e.g. open flat beds, wagons in the form of container flats, hoppered wagons, tanker wagons, passenger coaches, portable buildings, factory plant or the like. Some of these are shown in FIG. 23. The substance of the invention concerns only the manner in which they are conveyed.

I claim:

1. A convertible rail and highway vehicle for use on railroad rails and alternately for use on highways with tractors including at least one fifth wheel mechanism for engaging a cargo container, said vehicle comprising:
   (a) an elongated cargo container having a bottom planar exterior surface terminating in a first and second opposing ends and having a parallel upper planar surface forming the cargo bed of the container;
   (b) a pair of standard railwheel trucks spaced apart and operably connected to a portion of the bottom container surface adjacent the first and second opposing ends;
   (c) a major intermediate section of the bottom surface between the railwheel trucks being stepped downwardly therefrom such that the underside of each opposing end is at an appreciably higher level than the major intermediate section and the portion of the bottom surface supporting the railwheel trucks;
   (d) a first and second coupling means (fifth wheel coupling pin) centrally anchored to the first and second ends, respectively;
   (e) a bogie carriage means comprising two pairs of wheel assemblies rotatably connected to an elongated frame and provided with a third means for coupling with one of the first or second means for coupling and being pinned to one side of said cargo container;
   (f) said third means being a fifth wheel coupling plate supported on an upper portion of the frame of the bogie carriage and having a receptacle therein adapted to receive the coupling means on one container end; and
   (g) the coupling plate is inclined downwardly toward its external end and is made devoid of any capacity for lateral shifting, with its center line being fixed and coincident with the chassis of the bogie carriage, whereby the bogie wheel assembly can be moved and coupled to one end of the container bottom surface, thereby to lift one end of the cargo container along with its first railroad truck then being clear of the otherwise supporting rail trackage.

2. A convertible rail and highway vehicle for use on railroad rails and alternately for use on highways with tractors including at least one fifth wheel mechanism for engaging a cargo container, said vehicle comprising:
   (a) a elongated cargo container having a bottom planar exterior surface terminating in a first and second opposing ends and having adjoining and upstanding opposing lateral walls forming each container;
   (b) a pair of standard railwheel trucks spaced apart and operably connected to a portion of the bottom container surface adjacent the first and second opposing ends;
   (c) a major intermediate section of the bottom surface between the railwheel trucks being stepped downwardly therefrom such that the underside of each oppposing end is at an appreciably higher level than the major intermediate section and the portion of the bottom surface supporting the railwheel trucks;
   (d) a first and second coupling means (fifth wheel coupling pin) centrally anchored to the first and second ends, respectively;
   (e) a bogie carriage means comprising two pairs of wheel assemblies rotatably connected to an elongated frame and provided with a third means for coupling with one of the first or second means for coupling and being pinned to one end of the cargo container;
   (f) said third means being a fifth wheel coupling plate supported on an upper portion of the frame of the bogie carriage and having a receptacle therein adapted to receive the coupling means on one container end;
   (g) the coupling plate is inclined downwardly toward its external end and is made devoid of any capacity for lateral shifting, with its center line being fixed and coincident with the chassis of the bogie carriage, whereby the bogie wheel assembly can be moved and coupled to one end of the container bottom surface, thereby to lift one end of the cargo container along with its first railroad truck then being clear of the otherwise supporting rail trackage;
   (h) a second bogie carriage means comprising two pairs of wheel assemblies rotatably connected to an elongated frame and provided with fourth means for coupling with the other of said first or second coupling means anchored to the other end of the cargo container;
   (i) said fourth means being a second fifth wheel coupling plate supported on the upper portion of the frame of said second bogie carriage and adapted to receive the other of said first or second coupling means on the other container end.

3. A convertible rail and highway vehicle for use on railroad rails and alternatively for use on highway for tractors including mechanisms for engaging cargo containers comprising:
   (a) first and second elongated containers each having a bottom planar exterior surface terminating in first and second opposing ends with adjoining and upstanding opposing walls forming each container;
   (b) a pair of standard railway wheel trucks being connected to a portion of the bottom surface of each container adjacent the first and second opposing ends;
   (c) a major intermediate section of each of the bottom surfaces between the railwheel trucks being stepped downwardly therefrom such that the underside of each opposing end is at an appreciably higher level than the intermediate section and the portion of the bottom surface supporting the railwheel trucks;
   (d) on each container is provided a first and second coupling means each extending substantially vertically downwardly and being centrally anchored to the first and second container ends, respectively;
   (e) a bogie carriage for interconnecting two adjacent containers having at least two paired wheel assemblies mounted for rotation about at least two spaced apart underframe axes and adapted for coupling with either one of the coupling means in one container end and concurrently with the coupling means of one end of the other container;
   (f) a pair of fifth wheel coupling plates positioned adjacent to the opposing ends of the bogie and anchored to an upper portion of the frame of said bogie, each plate having a receptacle therein adapted to receive the coupling means on the adjacent container ends; and
   (g) further the coupling plates being inclined downwardly towards the outer ends of the bogie and being devoid of any capacity for lateral shifting, but being hingeably secured to the bogie frame to admit of sliding engagement with the coupling means on the adjacent container ends, whereby upon mating of the coupling means on the container ends and the bogie ends, rotation of the container ends relative to the bogie about upwardly extending axes is permitted, thereby placing the underside of each container at a higher level than the intermediate section of the container surface, and lifting the container ends with the railroad trucks assemblies clear of the otherwise supporting rail trackage.

4. A combination is claimed in claim 3, wherein each coupling means comprises a bearing plate and a kingpin.

5. A combination is claimed in claim 3 wherein the wheels of the bogie carriage are rail wheels.

6. A combination is claimed in claim 3 wherein the wheels of the bogie are road wheels.

7. An intermodal transport system including the convertible vehicle of claim 3, further comprising:
(a) a plurality of elongated cargo containers, each being provided with at least two railway wheel trucks adapted for operation on a railway trackage of a first gauge, and each being provided at each end with a coupling means adapted for coupling the containers together to form a railroad train of cargo containers;
(b) a plurality of bogie-type carriages each having at least two pairs of railroad wheels mounted for rotation about at least two spaced apart underframe axes and each carriage being provided with a pair of fifth wheel members rotatably mounted on an upper frame of the bogie about a pair of spaced apart vertical axes, that are adapted to be coupled with the coupling means anchored to the respective container ends; and
(c) the rail wheel pairs of the bogie carriage being sized for service on railway trackage of a second gauge.

8. A system is claimed in claim 7, wherein at least one of the bogie carriages is provided with roller means for supporting one of the containers on the bogie for longitudinal displacement to bring the respective coupling means on the containers and the bogie carriage into engagement with each other.

9. A system is claimed in claim 7 wherein at least one bogie carriage is provided with means for preventing relative rotation between a container and the bogie about an upwardly extending axis when the end region of the container is supported on the bogie carriage.

10. A system is claimed in claim 7 wherein at least one bogie carriage is provided with two second coupling means, whereby the bogie can be connected to two of the containers with each second coupling means of every one of the rail containers adapted to secure the bogie carriage to the containers such that the end region of each container is supported on the bogie.

11. A system is claimed in claim 7 wherein at least one bogie carriage is adapted to be driven beneath one end region of a container, thereby to raise that end region in order to cause the end region to be supported on the bogie carriage.

12. A combination as claimed in claim 3 wherein each container is constructed such that it is capable of withstanding a tensile or compressive force load at higher ends of at least 180,000 kilograms (81,800 pounds).

* * * * *